(12) United States Patent
Saito et al.

(10) Patent No.: US 10,177,565 B2
(45) Date of Patent: Jan. 8, 2019

(54) CONTACT SIGNAL CONVERTER

(71) Applicant: YOKOGAWA ELECTRIC CORPORATION, Musashino-shi, Tokyo (JP)

(72) Inventors: Hitoshi Saito, Musashino (JP); Nobuhiro Kanatani, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 183 days.

(21) Appl. No.: 15/109,929

(22) PCT Filed: Dec. 4, 2014

(86) PCT No.: PCT/JP2014/082119
§ 371 (c)(1),
(2) Date: Jul. 6, 2016

(87) PCT Pub. No.: WO2015/104926
PCT Pub. Date: Jul. 16, 2015

(65) Prior Publication Data
US 2016/0336742 A1 Nov. 17, 2016

(30) Foreign Application Priority Data
Jan. 7, 2014 (JP) ................................ 2014-000718

(51) Int. Cl.
*H02H 9/04* (2006.01)
*F16K 31/06* (2006.01)
*H01F 7/06* (2006.01)

(52) U.S. Cl.
CPC .............. *H02H 9/045* (2013.01); *F16K 31/06* (2013.01); *F16K 31/0675* (2013.01); *H01F 7/064* (2013.01)

(58) Field of Classification Search
CPC ...... F16K 31/06; F16K 31/0675; H01F 7/064; H02H 9/045
(Continued)

(56) References Cited

U.S. PATENT DOCUMENTS 4,038,846 A * 8/1977 Klann .................. G07C 9/0069
 292/143
4,718,454 A * 1/1988 Appleby ............... F16K 31/082
 137/624.11
(Continued)

FOREIGN PATENT DOCUMENTS

EP 1266143 B2 1/2010
JP S 51-108313 A 9/1976
(Continued)

OTHER PUBLICATIONS

Communication dated Sep. 20, 2017, from the European Patent Office in counterpart European Application No. 14877965.5.
(Continued)

*Primary Examiner* — Kevin J Comber
(74) *Attorney, Agent, or Firm* — Sughrue Mion, PLLC (57) ABSTRACT

The purpose of the present invention is to enable use of a solenoid-type electromagnetic valve (120) in a valve driving device (10) that performs wireless communication. A contact signal converter (110) that converts an on-off contact signal to a control signal for operating a solenoid-type electromagnetic valve (120) comprises an explosion protection barrier (115) which restricts the current of the control signal to be no more than a maximum current established for safety regarding solenoid-type electromagnetic valves (120), and a group of batteries (111), the number of which can ensure a voltage at which the voltage supplied via the explosion protection barrier (115) surpasses the operating voltage of the solenoid-type electromagnetic valve (120).

11 Claims, 7 Drawing Sheets

(58) Field of Classification Search
USPC .......................................................... 361/86
See application file for complete search history.

(56) References Cited

U.S. PATENT DOCUMENTS

| | | | | |
|---|---|---|---|---|
| 4,979,067 A | * | 12/1990 | Foley | ..................... G05F 1/569 361/18 |
| 2001/0020802 A1 | * | 9/2001 | Kitagawa | .............. H02J 7/0068 307/66 |
| 2013/0032737 A1 | | 2/2013 | Neilson et al. | |
| 2015/0184772 A1 | | 7/2015 | Inagaki et al. | |

FOREIGN PATENT DOCUMENTS

| | | |
|---|---|---|
| JP | S 63-46397 Y2 | 12/1988 |
| JP | 2003528269 A | 9/2003 |
| WO | 2012037516 A2 | 3/2012 |
| WO | 2013176086 A1 | 11/2013 |

OTHER PUBLICATIONS

Search Report (PCT/ISA/210) dated Feb. 24, 2015, issued by the International Searching Authority in counterpart International Application No. PCT/JP2014/082119.

Written Opinion (PCT/ISA/237) dated Feb. 24, 2015, issued by the International Searching Authority in counterpart International Application No. PCT/JP2014/082119.

* cited by examiner

CONTACT SIGNAL CONVERTER

TECHNICAL FIELD

The present invention relates to a contact signal converter configured to convert a contact signal for instructing a valve operation into an electromagnetic valve control signal, and particularly, to a contact signal converter capable of driving a solenoid-type electromagnetic valve.

RELATED ART

When remotely opening or closing a valve in a plant or the like, a control signal to instruct an opening or closing operation of the valve is sent from a terminal device for operation to a valve driving device. In the related art, communication between the operating device and the valve driving device has been performed by wired communication using a control signal line established between the terminal device and the valve driving device. In recent years, however, wireless communication is performed in many cases.

Figure 7:
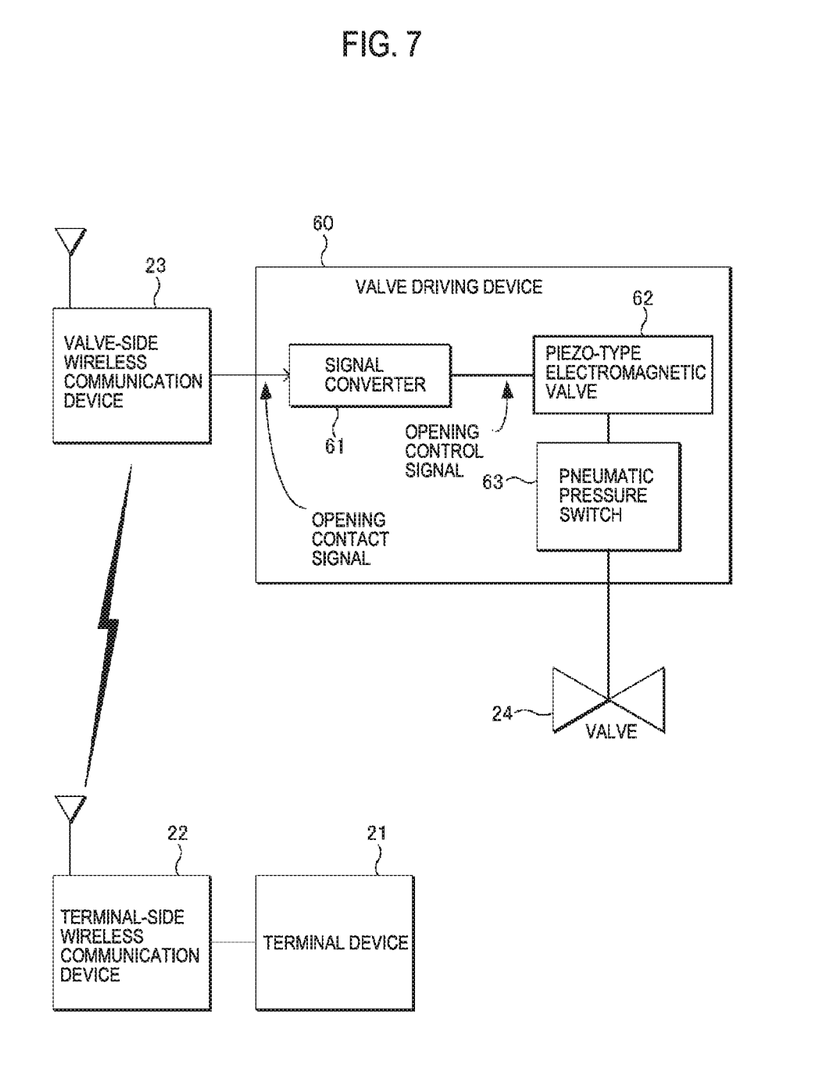
FIG. 7 depicts a related-art configuration of a terminal device and a valve driving device for performing wireless communication.

FIG. 7 depicts a configuration of the terminal device and the valve driving device for performing wireless communication. As shown in FIG. 7, a terminal device 21 for operation is connected with a terminal-side wireless communication device 22, and a valve driving device 60 for opening and closing operations of a valve is connected with a valve-side wireless communication device 23.

When an operator instructs an opening operation of the valve driving device 60 by the terminal device 21, a valve opening contact signal (ON) is wirelessly sent from the terminal-side wireless communication device 22 to the valve-side wireless communication device 23 and is transmitted to the valve driving device 60.

The valve driving device 60 has a signal converter 61, a piezo-type electromagnetic valve 62 and a pneumatic pressure switch 63. When the opening contact signal (ON) is transmitted from the valve-side wireless communication device 23, the signal converter 61 converts the same into an opening control signal (ON) for operating the piezo-type electromagnetic valve 62 and outputs the converted signal to the piezo-type electromagnetic valve 62. When the piezo-type electromagnetic valve 62 switches an electromagnetic valve, in response to the opening control signal (ON), the pneumatic pressure switch 63 drives a valve 24 and opens the valve 24.

When the operator instructs operation stop of the valve driving device 60 by the terminal device 21, an opening contact signal (OFF) is wirelessly sent from the terminal-side wireless communication device 22 to the valve-side wireless communication device 23 and is transmitted to the valve driving device 60. The signal converter 61 of the valve driving device 60 converts the valve opening contact signal (OFF) into an opening control signal (OFF) and outputs the same to the piezo-type electromagnetic valve 62. When the piezo-type electromagnetic valve 62 switches the electromagnetic valve, in response to the opening control signal (OFF), the opening operation of the valve stops.

CITATION LIST

Patent Documents

Patent Document 1: Japanese Patent Application Publication No. 2003-528269A

SUMMARY OF THE INVENTION

Problems to be Solved

In the valve driving device 60 configured to perform wireless communication, the piezo-type electromagnetic valve 62 is used as the electromagnetic valve. However, the piezo-type electromagnetic valve 62 is not general and has a low degree of selection freedom. Also, since there is no product meeting the intrinsically safe explosion protection specification in Japan, there is a limitation on the using place.

For this reason, it is desired to use a solenoid-type electromagnetic valve that is general, has a high degree of selection freedom and includes a product meeting the intrinsically safe explosion protection specification in Japan.

However, the solenoid-type electromagnetic valve requires higher power for operation, as compared to the piezo-type electromagnetic valve 62. Specifically, while the piezo-type electromagnetic valve 62 is enabled to operate with 0.003 W of 60V and 0.5 mA, the solenoid-type electromagnetic valve requires power 408 mW of DC 12V and 34 mA. For this reason, the piezo-type electromagnetic valve 62 cannot be simply replaced with the solenoid-type electromagnetic valve.

It is therefore an object of the present invention to enable use of a solenoid-type electromagnetic valve in a valve driving device configured to perform wireless communication.

Means for Solving the Problems

In order to achieve the above object, a contact signal converter according to a first aspect of the present invention is a contact signal converter configured to convert an on-off contact signal into a control signal for operating a solenoid-type electromagnetic valve. The contact signal converter includes an explosion protection barrier configured to restrict a current of the control signal to a maximum current or less established for safety regarding the solenoid-type electromagnetic valve, and a group of batteries, the number of which can ensure a voltage at which a voltage supplied via the explosion protection barrier surpasses an operating voltage of the solenoid-type electromagnetic valve.

Herein, the group of batteries may have the number of batteries by which a maximum open circuit voltage does not surpass the maximum voltage established for safety regarding the solenoid-type electromagnetic valve.

Alternatively, the group of batteries may have the number of batteries by which a maximum open circuit voltage surpasses the maximum voltage established for safety regarding the solenoid-type electromagnetic valve, and the explosion protection barrier may be further configured to restrict a voltage of the control signal to the maximum voltage or less established for safety regarding the solenoid-type electromagnetic valve.

At this time, the group of batteries has even batteries, and when a number of batteries is smaller than the number of the batteries of the group of batteries by one, the maximum open circuit voltage may not surpass the maximum voltage established for safety regarding the solenoid-type electromagnetic valve.

Also, the explosion protection barrier is preferably configured to restrict the voltage of the control signal to the maximum voltage or less established for safety regarding the solenoid-type electromagnetic valve by using a Zener diode.

The explosion protection barrier preferably has a sub-switch configured to be ON or OFF in accordance with the on-off contact signal and arranged at a front stage of the Zener diode.

In order to achieve the above object, a contact signal converter according to a second aspect of the present invention is a contact signal converter configured to convert an on-off contact signal into a control signal for operating a solenoid-type electromagnetic valve. The contact signal converter includes an explosion protection barrier configured to restrict a current of the control signal to a maximum current established for safety regarding the solenoid-type electromagnetic valve and to restrict a voltage of the control signal to a maximum voltage or less established for safety regarding the solenoid-type electromagnetic valve; a battery, and a booster circuit configured to boost an output voltage of the battery so that a voltage to be supplied via the explosion protection barrier becomes a voltage surpassing an operating voltage of the solenoid-type electromagnetic valve.

Effects of the Invention

According to the present invention, it is possible to use the solenoid-type electromagnetic valve in the valve driving device configured to perform wireless communication.

DETAILED DESCRIPTION OF PREFERRED EXEMPLARY EMBODIMENTS

<First Exemplary Embodiment>

Figure 1:
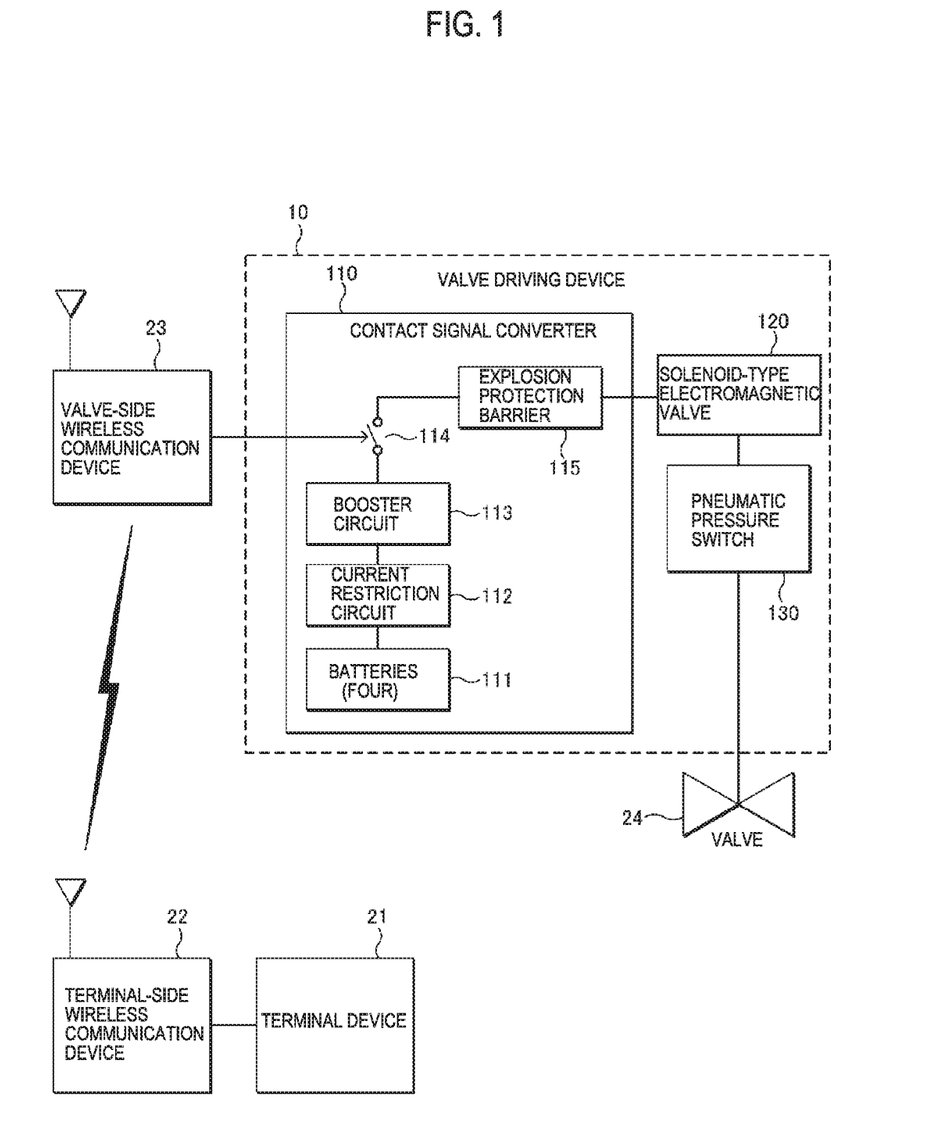
FIG. 1 is a block diagram depicting a first exemplary embodiment of the present invention.

Exemplary embodiments of the present invention will be described with reference to the drawings. FIG. 1 is a block diagram depicting a first exemplary embodiment of the present invention. As shown in FIG. 1, a terminal device 21 for operation is connected with a terminal-side wireless communication device 22, and a valve driving device 10 for opening and closing operations of the valve 24 is connected with a valve-side wireless communication device 23. The terminal device 21, the terminal-side wireless communication device 22, the valve-side wireless communication device 23 and the valve 24 are the same as the related art. In the below, an opening operation of the valve 24 is exemplified.

When an operator instructs an opening operation of a valve by the terminal device 21, an opening contact signal (ON) is wirelessly sent from the terminal-side wireless communication device 22 to the valve-side wireless communication device 23 and is transmitted to the valve driving device 10. Also, when the operator instructs stop of the valve by the terminal device 21, an opening contact signal (OFF) is wirelessly sent from the terminal-side wireless communication device 22 to the valve-side wireless communication device 23 and is transmitted to the valve driving device 10.

The valve driving device 10 has a contact signal converter 110, a solenoid-type electromagnetic valve 120, and a pneumatic pressure switch 130. The pneumatic pressure switch 130 is the same as the related art.

The solenoid-type electromagnetic valve 120 is an electromagnetic valve configured to operate with a voltage, a current and power, which are determined by the specification, and to control opening and closing operations of the pneumatic pressure switch 130. The solenoid-type electromagnetic valve 120 preferably meets the intrinsically safe explosion prevention specification. Herein, it is assumed that the solenoid-type electromagnetic valve 120 is configured to operate with DC 12V, 34 mA and 408 mW, which are a general voltage value, a current value and a power value.

The contact signal converter 110 has batteries ill, a current restriction circuit 112, a booster circuit 113, a switch 114 and an explosion protection barrier 115.

The booster circuit 113 is configured to boost a voltage, which is to be supplied by the batteries 111, to 24V, which is twice as high as an operating voltage (12V) of the solenoid-type electromagnetic valve 120. The reason is that a maximum efficiency of the explosion protection barrier 115 is 50%. As the booster circuit 113, a general DC-DC converter or the like can be used.

The switch 114 is a switch that becomes ON or OFF in accordance with an ON or OFF state of the valve opening contact signal transmitted from the valve-side wireless communication device 23. As the switch 114, a general FET, a transistor or the like can be used.

The explosion protection barrier 115 is a circuit configured to restrict an output of the booster circuit 113 to an intrinsically safe circuit maximum voltage or less, which is a maximum voltage established for safety regarding the solenoid-type electromagnetic valve 120, and to an intrinsically safe circuit maximum current or less, which is a maximum current established for safety regarding the solenoid-type electromagnetic valve 120. The intrinsically safe circuit maximum voltage of the solenoid-type electromagnetic valve 120 is 29.4V, for example, and the intrinsically safe circuit maximum current is 93.8 mA, for example.

Figure 2:
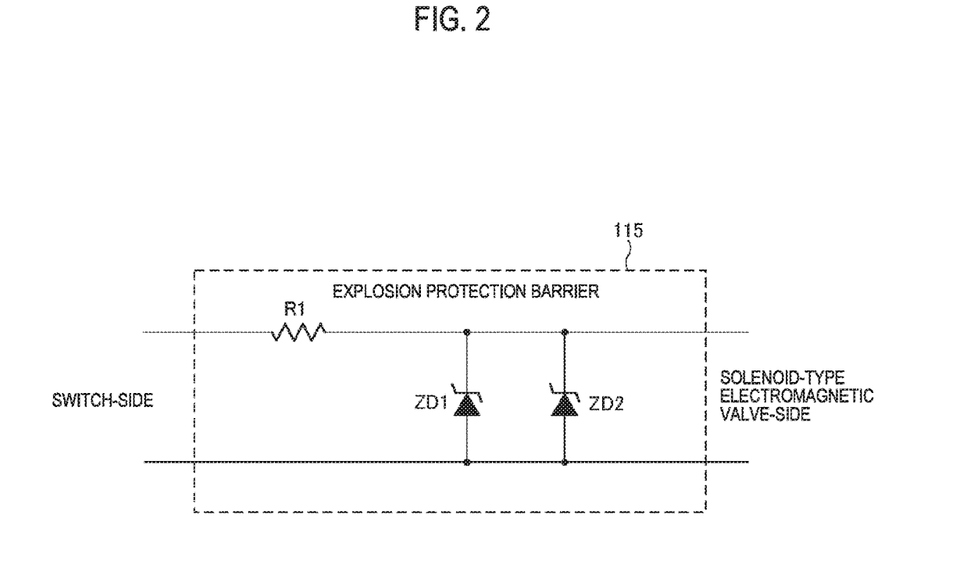
FIG. 2 is a circuit diagram depicting a configuration example of an explosion protection barrier.

FIG. 2 is a circuit diagram depicting a configuration example of the explosion protection barrier 115. In the example of FIG. 2, the current is restricted by a resistance R1, and the voltage is restricted to 29.4V or less by Zener diodes ZD1, ZD2. The explosion protection barrier 115 may have another circuit configuration.

Returning to FIG. 1, the current restriction circuit 112 is a circuit configured to restrict the current flowing from the batteries 111 into the booster circuit 113. The current restriction circuit 112 may be configured by a series resistor, for example As the batteries 111, four batteries for a field device having a general nominal voltage 3.6V (a maximum open circuit voltage 3.9V) are used. The maximum efficiency of the current restriction circuit 112 is 50%, the maximum efficiency of the booster circuit 113 is generally about 80%, and the maximum efficiency of the explosion protection barrier 115 is 50%. For this reason, in order to feed the operating power 408 mW of the solenoid-type electromagnetic valve 120, an output power of the batteries 111 is set to 2 W (≈408 mW/(0.5×0.8×0.5)) or higher.

When the valve opening contact signal (ON) is transmitted from the valve-side wireless communication device 23, the switch 114 of the contact signal converter 110 becomes ON. When the switch 114 becomes ON, an opening control signal (ON) is transmitted to the solenoid-type electromagnetic valve 120 via the explosion protection barrier 115. The opening control signal is a signal obtained by boosting the output voltage of the batteries 111 with the booster circuit 113. A voltage of the opening control signal is a voltage capable of operating the solenoid-type electromagnetic valve 120.

In this way, according to the first exemplary embodiment, it is possible to use the solenoid-type electromagnetic valve 120 in the valve driving device 10 configured to perform wireless communication by boosting the output voltage of the batteries 111 with the booster circuit 113.

<Second Exemplary Embodiment>

In the below, a second exemplary embodiment of the present invention is described. In the first exemplary embodiment, in order to feed the operating power of 408 mW to the solenoid-type electromagnetic valve 120, it is necessary to provide the batteries ill having a power feeding capacity of 2 W, which is five times or higher. In order to design an intrinsically safe explosion protection structure, it is required to prevent ignition of a combustible gas, which is caused due to heating of a small component when 2 W, which is the power feeding capacity of the batteries 111, is applied to the small component. Also, if a power feeding capacity of a battery can be set to 1.3 W or less, a component of which a surface area exceeds 20 mm$^2$ is classified into a temperature class T4. For this reason, if the power feeding capacity of the battery is set to 1.3 W or less, it is possible to easily design an intrinsically safe explosion protection structure.

Therefore, in the second exemplary embodiment, the solenoid-type electromagnetic valve 120 is enabled to be used in the valve driving device configured to perform wireless communication by using batteries of which the power feeding capacity is 1.3 W or less.

Figure 3:
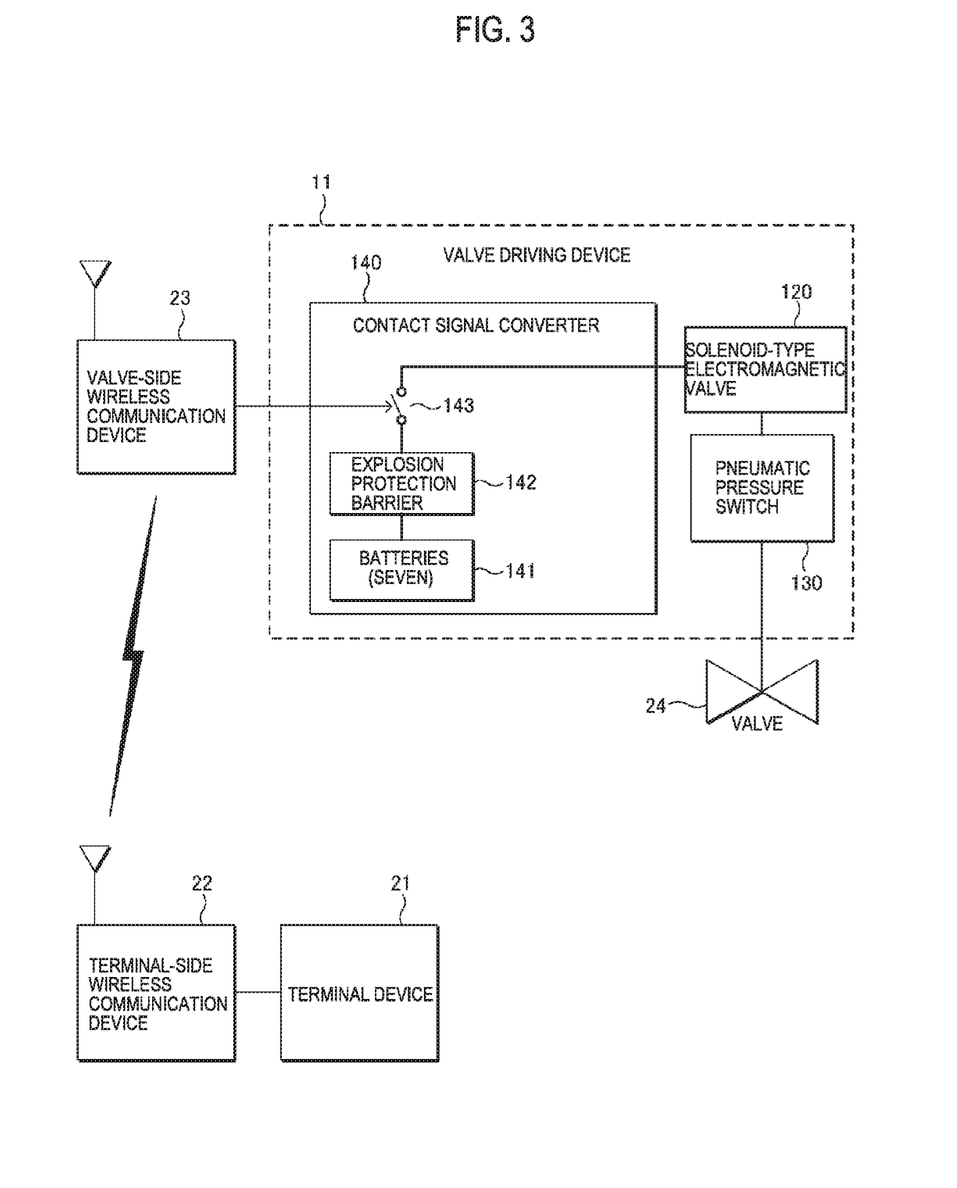
FIG. 3 is a block diagram depicting a second exemplary embodiment of the present invention.

FIG. 3 is a block diagram depicting the second exemplary embodiment of the present invention. The same blocks as the first exemplary embodiment are denoted with the same reference numerals. As shown in FIG. 3, the terminal device 21 for operation is connected with the terminal-side wireless communication device 22, the valve driving device 11 for opening and closing operations of the valve is connected with the valve-side wireless communication device 23.

The valve driving device 11 has a contact signal converter 140, the solenoid-type electromagnetic valve 120 and the pneumatic pressure switch 130. Also in the second exemplary embodiment, it is assumed that the solenoid-type electromagnetic valve 120 is configured to operate with DC 12V, 34 mA and 408 mW, which are a general voltage value, a current value and a power value.

The contact signal converter 140 has batteries 141, an explosion protection barrier 142 and a switch 143. As the batteries 141, seven batteries for a field device having a general nominal voltage 3.6V (a maximum open circuit voltage 3.9V) are used in series. When the seven batteries, each of which has a nominal voltage 3.6V, are used in series, a nominal voltage is 25.2V and a voltage to be supplied to the solenoid-type electromagnetic valve 120 via the explosion protection barrier 142 having a maximum efficiency 50% is 12.6V. Thereby, the supplied voltage surpasses the operating voltage of the solenoid-type electromagnetic valve 120 without using the booster circuit. For this reason, it is not necessary to provide a circuit for restricting the current to flow into the booster circuit, so that it is possible to prevent the efficiency from being lowered.

Also, when the seven batteries are used in series, the maximum open circuit voltage is 27.3V and does not surpass the intrinsically safe circuit maximum voltage 29.4V of the solenoid-type electromagnetic valve 120. For this reason, it is not necessary to provide the explosion protection barrier 142 with an element for restricting a voltage, for example, a Zener diode. However, when the explosion protection barrier 115 using a Zener diode (refer to FIG. 2) is used, batteries of which a maximum open circuit voltage surpasses 29.4V may be used.

Since the efficiency of the explosion protection barrier 142 is 50%, the maximum 50% power of the batteries 141 can be used for the switching operation of the solenoid-type electromagnetic valve 120. For this reason, as the power feeding capacity of the batteries 141, 816 mW(=408 mW/0.5) is sufficient. Thereby, it is possible to use the solenoid-type electromagnetic valve 120 in the valve driving device configured to perform wireless communication by using the batteries of which the power feeding capacity is 1.3 W or less.

<Third Exemplary Embodiment>

In the below, a third exemplary embodiment of the present invention is described. In the second exemplary embodiment, the group of batteries of which the power feeding capacity is 1.3W or less is configured using the seven batteries and the solenoid-type electromagnetic valve 120 is thus enabled to be used in the valve driving device configured to perform wireless communication.

However, a battery pack configured to accommodate therein the group of batteries has a specification that the even batteries are generally to be accommodated. Therefore, the configuration of using the odd batteries lacks the general versatility. Therefore, it is considered to use eight batteries.

When the eight batteries, each of which has a nominal voltage 3.6V (the maximum open circuit voltage 3.9V), are used, it is possible to use a versatile battery pack, thereby saving the cost. However, the maximum open circuit voltage to be supplied is 31.2V and surpasses the intrinsically safe circuit maximum voltage 29.4V of the solenoid-type electromagnetic valve 120. For this reason, it is necessary to provide the explosion protection barrier with an element for voltage restriction, for example, a Zener diode, as shown in FIG. 2.

In this case, the Zener diode is always conductive, irrespective of ON and OFF states of the opening contact signal, so that the Zener current continues to flow. For this reason, an amount of consumption of the battery increases, so that the durability of the battery is lowered.

Therefore, in the third exemplary embodiment, the solenoid-type electromagnetic valve 120 is enabled to be used in the valve driving device configured to perform wireless communication by using the eight batteries enabling a general battery pack to be used.

Figure 4:
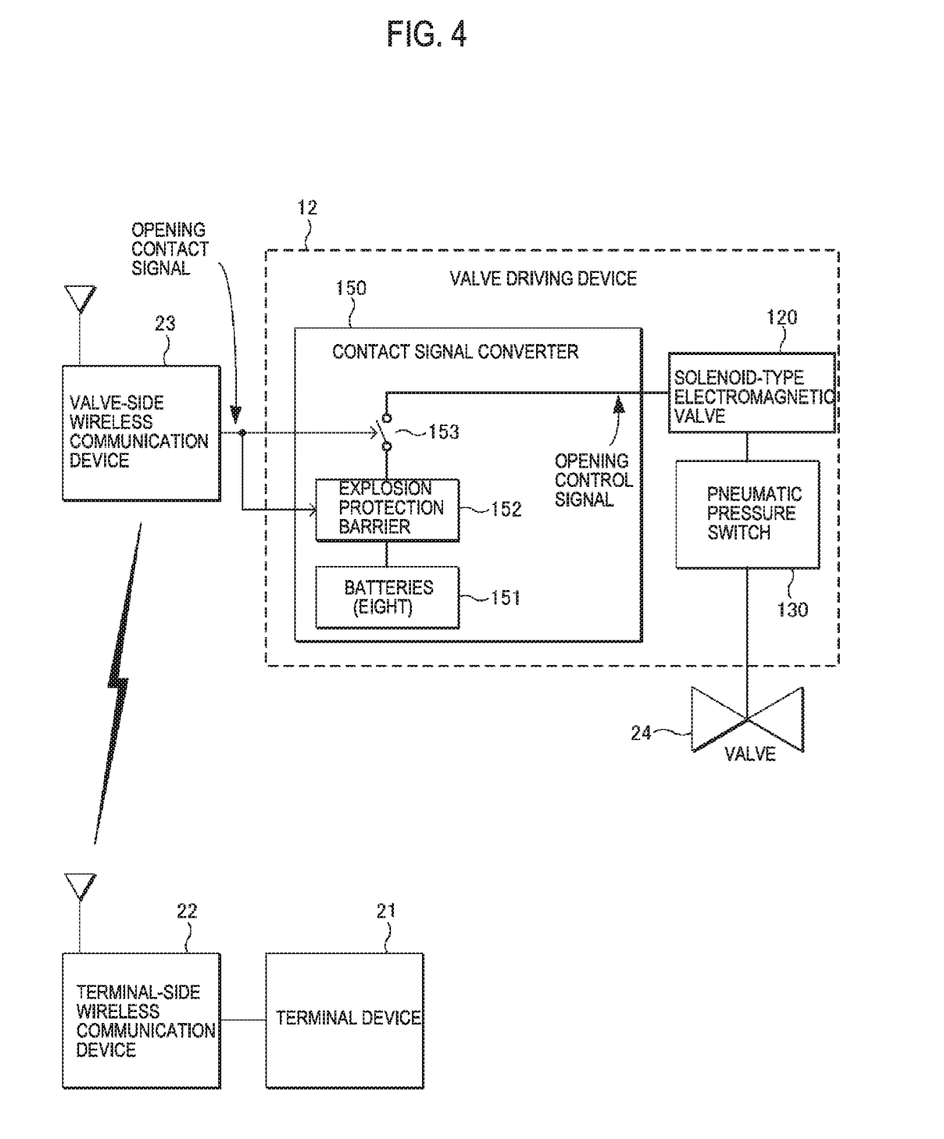
FIG. 4 is a block diagram depicting a third exemplary embodiment of the present invention.

FIG. 4 is a block diagram depicting the third exemplary embodiment. The same blocks as the first exemplary embodiment are denoted with the same reference numerals. As shown in FIG. 4, the terminal device 21 for operation is connected with the terminal-side wireless communication device 22, and the valve driving device 12 for opening and closing operations of the valve is connected with the valve-side wireless communication device 23.

The valve driving device 12 has a contact signal converter 150, the solenoid-type electromagnetic valve 120 and the pneumatic pressure switch 130. Also in the third exemplary embodiment, it is assumed that the solenoid-type electromagnetic valve 120 is configured to operate with DC 12V, 34 mA and 408 mW, which are a general voltage value, a current value and a power value.

The contact signal converter 150 has batteries 151, an explosion protection barrier 152 and a switch 153. As the batteries 151, eight batteries for a field device having a general nominal voltage 3.6V (a maximum open circuit voltage 3.9V) are used in series. Thereby, it is possible to use a general battery pack.

Figure 5:
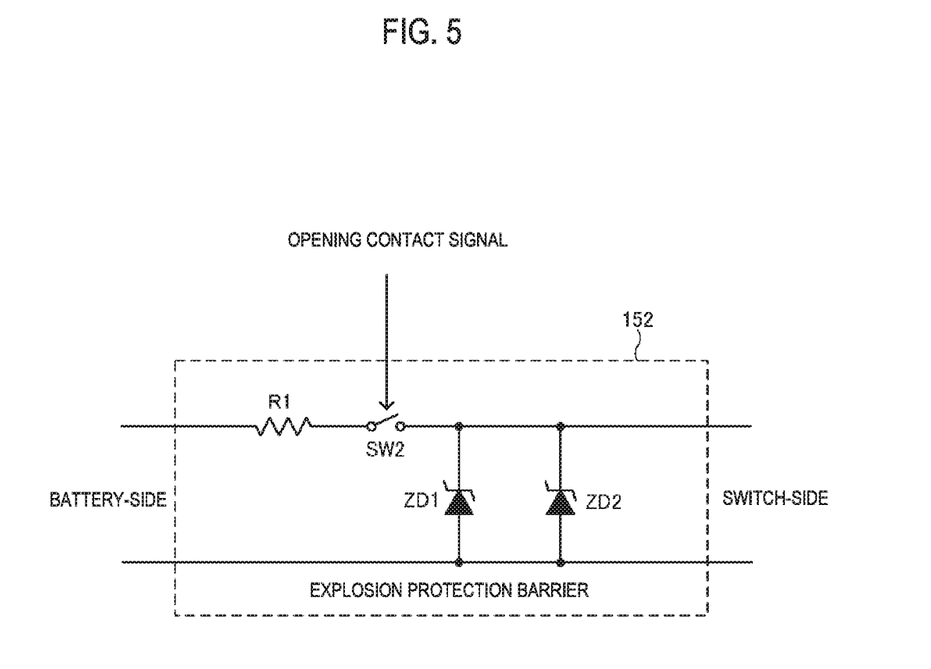
FIG. 5 depicts a configuration of an explosion protection barrier in the third exemplary embodiment.

In the third exemplary embodiment, the opening contact signals (ON and OFF) are input to the explosion protection barrier 152, in addition to the switch 153. FIG. 5 depicts a configuration of the explosion protection barrier 152 in the third exemplary embodiment. As shown in FIG. 5, the explosion protection barrier 152 has not only the resistance R1 for current restriction and the Zener diodes ZD1, ZD2 for voltage restriction but also a sub-switch SW2 provided at a front stage of the Zener diodes ZD1, ZD2 and configured to be switched in accordance with ON and OFF states of the opening contact signal.

The sub-switch SW2 is switched to OFF when the opening contact signal is OFF. For this reason, the current from the batteries 151 does not flow through the Zener diodes ZD1, ZD2, so that the batteries are not consumed.

On the other hand, the sub-switch SW2 is switched to ON when the opening contact signal is ON. Thereby, the Zener current is enabled to flow, so that it is possible to restrict the voltage, which is to be applied to the solenoid-type electromagnetic valve 120, to the maximum voltage value or less.

In the meantime, when the Zener diodes are arranged at a rear stage of the switch 153, the sub-switch is not required. However, the explosion protection barrier 152 of the third exemplary embodiment is provided with the sub-switch SW2 at the front stage of the Zener diodes ZDI, ZD2 due to a spaced distance necessary to insulate the battery 151 and the switch 153 therebetween.

Figure 6:
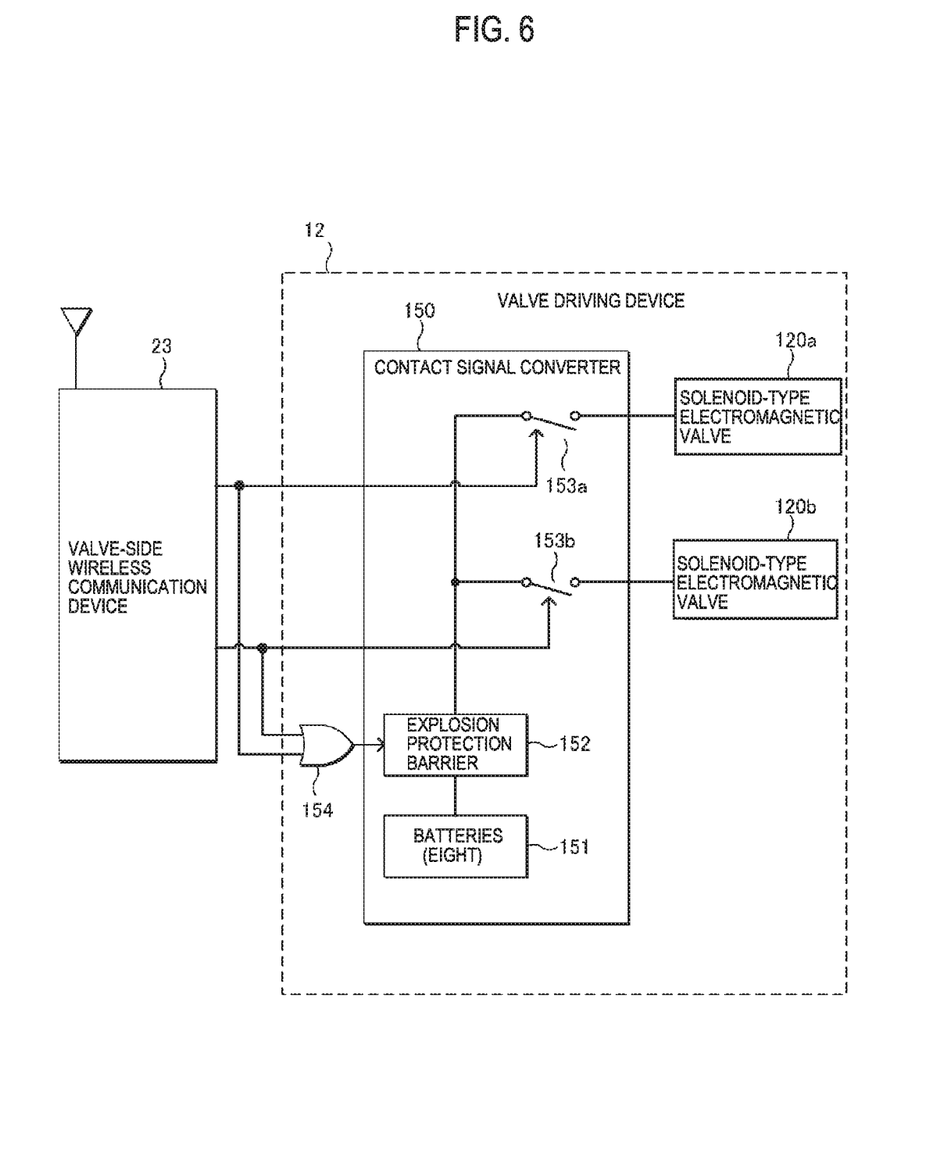
FIG. 6 is a block diagram depicting a configuration of controlling opening and closing operations of a plurality of solenoid-type electromagnetic valves by a valve-side wireless communication device.

In the below, a configuration where opening and closing operations of a plurality of solenoid-type electromagnetic valves are controlled by the valve-side wireless communication device 23 is described with reference to FIG. 6. When controlling the opening and closing operations of the plurality of solenoid-type electromagnetic valves, the opening contact signals, which are to be supplied to respective solenoid-type electromagnetic valves 120a, 120b, are input to an OR gate 154, too, and the ON and OFF states of the sub-switch SW2 in the explosion protection barrier 152 are controlled by an output signal of the OR gate 154, as shown in FIG. 6.

The above descriptions have been made for the specific exemplary embodiments for the purpose of explaining and illustrating the present invention. Therefore, the present invention is not limited to the above exemplary embodiments and can be variously changed and modified without departing from the gist of the present invention.

The subject application is based on a Japanese Patent Application No. 2014-000718 filed on Jan. 7, 2014, which is entirely incorporated herein for reference. Also, all references that are to be herein cited are included as a whole.

DESCRIPTION OF REFERENCE NUMERALS

10 . . . valve driving device, 11 . . . valve driving device, 12 . . . valve driving device, 21 . . . terminal device, 22 . . . terminal-side wireless communication device, 23 . . . valve-side wireless communication device, 24 . . . valve, 110 . . . contact signal converter, 111 . . . battery, 112 . . . current restriction circuit, 113 . . . booster circuit, 114 . . . switch, 115 . . . explosion protection barrier, 120 . . . solenoid-type electromagnetic valve, 130 . . . pneumatic pressure switch, 140 . . . contact signal converter, 141 . . . battery, 142 . . . explosion protection barrier, 143 . . . switch, 150 . . . contact signal converter, 151 . . . battery, 152 . . . explosion protection barrier, 153 . . . switch

The invention claimed is:

1. An apparatus comprising:
    a wireless communication device configured to wirelessly receive an on-off contact signal;
    a contact signal converter configured to, in response to the on-off contact signal, convert the on-off contact signal into a control signal for operating a solenoid-type electromagnetic valve, the contact signal converter comprising:
        an explosion protection barrier configured to restrict a current of the control signal to a maximum current or less established for safety regarding the solenoid-type electromagnetic valve; and
        a group of batteries, the number of which can ensure a voltage at which a voltage of the control signal supplied via the explosion protection barrier surpasses an operating voltage of the solenoid-type electromagnetic valve.

2. The apparatus according to claim 1, wherein the group of batteries has the number of batteries by which a maximum open circuit voltage does not surpass the maximum voltage established for safety regarding the solenoid-type electromagnetic valve.

3. The apparatus according to claim 1, wherein the group of batteries has the number of batteries by which a maximum open circuit voltage surpasses the maximum voltage established for safety regarding the solenoid-type electromagnetic valve, and
    wherein the explosion protection barrier is further configured to restrict a voltage of the control signal to the maximum voltage or less established for safety regarding the solenoid-type electromagnetic valve.

4. The apparatus according to claim 3, wherein the group of batteries has even batteries, and
    wherein when a number of batteries is smaller than the number of the batteries of the group of batteries by one, the maximum open circuit voltage does not surpass the maximum voltage established for safety regarding the solenoid-type electromagnetic valve.

5. The apparatus according to claim 4, wherein the explosion protection barrier is configured to restrict the voltage of the control signal to the maximum voltage or less established for safety regarding the solenoid-type electromagnetic valve by using a Zener diode.

6. The apparatus according to claim 5, wherein the explosion protection barrier has a sub-switch configured to be ON or OFF in accordance with the on-off contact signal and arranged at a front stage of the Zener diode.

7. The apparatus according to claim 3, wherein the explosion protection barrier is configured to restrict the voltage of the control signal to the maximum voltage or less established for safety regarding the solenoid-type electromagnetic valve by using a Zener diode.

8. The apparatus according to claim 7, wherein the explosion protection barrier has a sub-switch configured to be ON or OFF in accordance with the on-off contact signal and arranged at a front stage of the Zener diode.

9. An apparatus comprising:
a battery configured to supply a battery voltage;
a booster circuit configured to boost the battery voltage to a boost voltage such that a voltage to be supplied via the explosion protection barrier surpasses an operating voltage of a solenoid-type electromagnetic valve; and
an explosion protection barrier configured to receive the boost voltage and output a control signal for operating the solenoid-type electromagnetic valve by restricting a current of the control signal to a maximum current established for safety regarding the solenoid-type electromagnetic valve and to restrict a voltage of the control signal to a maximum voltage or less established for safety regarding the solenoid-type electromagnetic valve.

10. The apparatus according to claim 9, further comprising a wireless communication device configured to wirelessly receive an on-off contact signal, wherein the on-off contact signal controls the control signal.

11. A contact signal converter configured to convert an on-off contact signal into a control signal for operating a solenoid-type electromagnetic valve, the contact signal converter comprising:

an explosion protection barrier configured to restrict a current of the control signal to a maximum current or less established for safety regarding the solenoid-type electromagnetic valve; and
a group of batteries, the number of which can ensure a voltage at which a voltage supplied via the explosion protection barrier surpasses an operating voltage of the solenoid-type electromagnetic valve
wherein the group of batteries has an even number of batteries by which a maximum open circuit voltage surpasses the maximum voltage established for safety regarding the solenoid-type electromagnetic valve,
wherein when a number of batteries is smaller than the even number of the batteries of the group of batteries by one, the maximum open circuit voltage does not surpass the maximum voltage established for safety regarding the solenoid-type electromagnetic valve, and
wherein the explosion protection barrier is further configured to restrict a voltage of the control signal to the maximum voltage or less established for safety regarding the solenoid-type electromagnetic valve.

* * * * *